United States Patent
Tomokuni et al.

(10) Patent No.: US 6,863,973 B2
(45) Date of Patent: Mar. 8, 2005

(54) FIBER-REINFORCED PLASTIC MOLDED ARTICLE, ITS PRODUCTION METHOD AND A MOLDING MOLD USING THAT METHOD

(75) Inventors: Hidehiko Tomokuni, Osaka (JP); Ou Shibata, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 142 days.

(21) Appl. No.: 09/976,036

(22) Filed: Oct. 15, 2001

(65) Prior Publication Data

US 2003/0035961 A1 Feb. 20, 2003

(30) Foreign Application Priority Data

Apr. 12, 2001 (JP) ...................................... P2001-113937

(51) Int. Cl.$^7$ ........................... B32B 5/16; B32B 27/38; B32B 27/40; B32B 27/36; B32B 27/00
(52) U.S. Cl. ....................... 428/323; 428/330; 428/413; 428/414; 428/423.1; 428/480; 428/500
(58) Field of Search ................................ 428/323, 330, 428/411.1, 413, 414, 423.1, 480, 500

(56) References Cited

U.S. PATENT DOCUMENTS 4,568,604 A        2/1986   Kurtz et al. ................. 428/297
6,207,077 B1  *    3/2001   Burnell-Jones ......... 252/301.36

OTHER PUBLICATIONS

Database WPI, XP–002222873, JP 50 034363 (Eidai Co. Ltd.), Abstract, Apr. 2, 1975.
Database WPI, XP–002222874, JP 05 193011 (Hitachi Chem. Co. Ltd.), Abstract, Aug. 3, 1993.
Database WPI, XP–002222875, JP 2001 105441 (Dainippon Ink & Chem. Inc.), Abstract, Apr. 17, 2001.

"Practical Plastic Encyclopedia", p. 230, first edition, published by Sangyo Chosakai, May 1, 1993.

"Polyester Resin Handbook", p. 270, first edition, published by The Nikkan Kogyo Shimbun, Ltd., on Jun. 30, 1985.

* cited by examiner

*Primary Examiner*—Sheeba Ahmed
(74) *Attorney, Agent, or Firm*—Armstrong, Kratz, Quintos, Hanson & Brooks, LLP

(57) ABSTRACT

The present invention relates to a fiber-reinforced plastic molded article including a surface layer (A) composed of a polymer material, an intermediate layer (B) and a fiber-reinforced plastic layer (C); wherein (1) said intermediate layer (B) is composed of the cured product of an intermediate layer composition comprising a curable resin composition including a polymerizable unsaturated monomer and a polymerization curable unsaturated resin, a filler and a thixotropic agent, (2) said curable resin composition is able to form a casting plate having tensile elongation percentage of 2 to 50% and Barcol hardness (B value) of 50 or more by its curing, (3) the content of said filler is 30 to 150 parts by weight relative to 100 parts by weight of curable resin composition, and (4) the content of said thixotropic agent is 1 to 4 parts by weight relative to 100 parts by weight of curable resin composition.

9 Claims, No Drawings

FIBER-REINFORCED PLASTIC MOLDED ARTICLE, ITS PRODUCTION METHOD AND A MOLDING MOLD USING THAT METHOD

BACKGROUND OF THE INVENTION

1. Field of the Invention

The present invention relates to a fiber-reinforced plastic molded article having stable surface smoothness with respect to temperature changes as well as superior blistering resistance, and relates to its production method and a molding mold equipped with the fiber-reinforced plastic molded article.

2. Description of Related Art

Fiber-reinforced plastic molded articles are provided with a cured layer of a gelcoat resin as necessary for the purpose of obtaining design properties (coloring, pattern formation), weather resistance, hot water resistance, chemical resistance and stain resistance. Said cured layer is formed in the form of a cured film having a thickness of about 0.3 to 0.5 mm by spraying at normal temperature onto a mold a curable resin composition including unsaturated polyester, epoxy(meth) acrylate, urethane(meth)acrylate, or their mixture, polymerizable unsaturated monomer, curing accelerator, curing agent, pigment, and so forth, as necessary according to the application and performance level, followed by obtaining a molded article by curing a fiber-reinforced plastic layer laminated in the next step together with integrating into a single unit.

As an example of a typical method for obtaining molded articles in the case of molding this fiber-reinforced plastic molded article, molding is normally carried out by hand lay up molding or spray up molding, and a polymerizable unsaturated resin composition able to be cured at normal temperature is impregnated using a degassing roller into chopped strand mat and/or roving cloth, etc. having a fiber length of about 2 inches in the case of the former molding, or into about 1 inch chopped strand in the case of the latter molding, followed by curing and demolding.

At that time, when curing shrinkage of the fiber-reinforced plastic layer is observed from a microscopic viewpoint, differences occur in curing shrinkage between the vicinity of the fiber-reinforced material and resin-rich sections. As a result, even if a gelcoat resin layer is coated with said fiber-reinforced plastic layer, the problem of appearance defects occurs that are referred to as print through of the fiber pattern in which the orientation pattern of the fiber-reinforced material lifts away from the gelcoat resin surface in the form of surface irregularities. These appearance defects, which impair the surface smoothness of molded articles, may be corrected by polishing and so forth depending on their degree, and a considerable amount of time and labor are required for their correction. In addition, even if the surface of the cured gelcoat resin layer is smooth immediately after demolding, the surface smoothness of the molded article may be impaired due to progression of curing of the fiber-reinforced plastic layer.

Since the above gelcoat resin normally contains 5 wt % or less of filler, the above problem of appearance defects caused by print through of the fiber pattern cannot be solved. In addition, if a large amount of filler is contained, the problem occurs in which the required attractiveness of the outermost layer of the fiber-reinforced plastic molded article as a gelcoat layer is impaired.

In addition, the inventors of the present invention conducted studies for improving the surface smoothness of molded articles by adding as low profile agent a thermoplastic plastic such as polystyrene or vinyl polyacetate, or by using the low shrinkage dicyclopentadiene-based unsaturated resin composition described in Japanese Unexamined Patent Application, First Publication No. 4-198209.

However, when a thermoplastic polymer is added as a low profile agent, due to the poor compatibility between the polymerization cured unsaturated resin composition and thermoplastic polymer, separation of the thermoplastic polymer occurs which prevents the obtaining of a uniform cured product.

In addition, in the case of using a low shrinkage dicyclopentadiene-based unsaturated resin composition, surface smoothness is greatly affected by molding conditions such as laminated thickness, molding temperature and amount of time from completion of lamination to demolding all at once. Moreover, in the case curing is insufficient at the time of demolding, the surface smoothness of the molded article worsens over time in the same manner as conventional unsaturated resin compositions.

Moreover, depending on the application, although there are cases in which a coating material such as a colored acrylic urethane coating is applied to the exterior of a gelcoat resin layer in order to obtain higher visual quality in terms of high design properties and high weather resistance once a molded article has been fabricated, in such cases as well, the problem occurred in which the visual surface smoothness of the product after coating becomes inferior due to deterioration of surface smoothness of the cured gelcoat resin layer of the molded article.

Typical fiber-reinforced plastic molded articles are obtained by a lamination molding method using a molding mold made of fiber-reinforced plastic including a cured gelcoat resin layer and a fiber-reinforced plastic layer. However, in the same manner as the above-mentioned problems, this molding mold made of fiber-reinforced plastic made it difficult to fabricate a molding mold made of fiber-reinforced plastic having a high surface smoothness due to curing shrinkage of the fiber-reinforced plastic layer on the bottom of the cured gelcoat resin layer. Since visual quality and surface smoothness of molded articles are affected by the surface condition of the molding mold, if a molded article is fabricated using a molding mold in which surface smoothness has been impaired, a molded article is obtained in which the surface smoothness is impaired since the surface of that molding mold is transcribed to the surface of the molded article. Consequently, molded articles having high surface smoothness are fabricated by correcting the surface of the resulting molded articles by polishing. However, since the surface condition of a molding mold itself made of fiber-reinforced plastic changes accompanying changes in temperature during hot molding or molding accompanied by generation of heat from curing, the surface smoothness obtained by that polishing is impaired and as a result, molded articles are obtained in which surface smoothness is impaired. Consequently, there is a need for a fiber-reinforced plastic molding mold in which the surface is not affected by temperature changes.

SUMMARY OF THE INVENTION

An object of the present invention is to provide a fiber-reinforced plastic molded article having stable surface smoothness with respect to changes in temperature. Another object of the present invention is to provide a fiber-reinforced plastic molded article having stable surface smoothness with respect to changes in temperature as well as stable surface smoothness with respect to fluctuations in molding conditions. Another object of the present invention is to provide a fiber-reinforced plastic molded article having superior surface smoothness that is not affected by changes in temperature that is able to prevent the formation of cracks in a surface layer without the occurrence of blisters in a back fiber-reinforced plastic layer. Moreover, another object of the present invention is to provide a production method of the above molded article.

As a result of conducting earnest studies on the above problems, the inventors of the present invention found that the above problems can be solved by providing a cured intermediate layer between the surface layer and fiber-reinforced plastic layer of a molded article using a specific composition comprising a curable resin composition including a polymerizable unsaturated monomer and polymerization curable unsaturated resin, a filler, and a thixotropic agent, thereby leading to completion of the present invention.

Namely, the present invention provides a fiber-reinforced plastic molded article including a surface layer (A) containing a polymer material, an intermediate layer (B), and a fiber-reinforced plastic layer (C), wherein (1) said intermediate layer (B) is composed of a cured product of an intermediate layer composition comprising a curable resin composition including a polymerizable unsaturated monomer and a polymerization curable unsaturated resin, a filler, and a thixotropic agent, (2) said curable resin composition is able to form a casting plate having a tensile elongation percentage of 2 to 50% and a Barcol hardness (B value) of 50 or more by its curing, (3) the content of said filler is 30 to 150 parts by weight relative to 100 parts by weight of the curable resin composition, and (4) the content of said thixotropic agent is 1 to 4 parts by weight relative to 100 parts by weight of the curable resin composition.

The filler may contain a hollow filler having a mean particle size of 5 to 200 μm. The curable resin composition may have a gelation time of 10 to 30 minutes and a viscosity of 20 to 40 poise. Alternatively, the curable resin composition may have a gelation time of 3 to 8 minutes a viscosity of more than 40 but no more than 100 poise. The polymerization curable unsaturated resin may be at least one type selected from a group including epoxy(meth)acrylate resin, urethane(meth)acrylate resin, and unsaturated polyester.

The curable resin composition is preferably able to form a casting plate having a tensile elongation percentage of 3 to 10% and a Barcol hardness (B value) of 50 to 95 by its curing. Alternatively, the curable resin composition is preferably able to form a casting plate having a Heat Deflection temperature of 60° C. or more, a tensile strength of 10 MPa or more, and a Barcol hardness (A value) of 30 or more.

The filler may be calcium carbonate powder. The surface layer (A) may be composed of a cured product of a gelcoat resin.

Moreover, the present invention provides a molding mold equipped with the aforementioned fiber-reinforced plastic molded article.

Moreover, the present invention provides a method of producing a fiber-reinforced plastic molded article comprising (1) forming a surface layer (A) with a gelcoat resin on a mold inner surface, (2) spraying an intermediate layer composition onto said surface layer (A) followed by curing to form an intermediate layer (B), and (3) curing a fiber-reinforced plastic layer composition including a fiber reinforcing material and a curable resin composition containing a polymerizable unsaturated monomer and a polymerization curable unsaturated resin on said intermediate layer (B) to form a fiber-reinforced plastic layer (C), wherein said intermediate layer composition includes a curable resin composition containing a polymerizable unsaturated monomer and a polymerization curable unsaturated resin, a filler, and a thixotropic agent, said curable resin composition is able to form a casting plate having a tensile elongation percentage of 2 to 50% and a Barcol hardness (B value) of 50 or more by its curing, the content of said filler is 30 to 150 parts by weight relative to 100 parts by weight of said curable resin composition, and the content of said thixotropic agent is 1 to 4 parts by weight relative to 100 parts by weight of said curable resin composition

DETAILED DESCRIPTION OF THE INVENTION

Prior to providing a detailed explanation of the present invention, the following provides an explanation regarding the definition of technical terms used in the present invention.

Casting Plate

The technical term, casting plate, refers to a casting plate fabricated according to the following method in compliance with "5.2.3 Production of Test Pieces" in Japanese Industrial Standard JIS-K6919.

(1) Two glass plates that have been treated with wax or another mold release agent and have satisfactory smoothness were made available.

(2) A U-shaped spacer having a thickness of 3.0±0.2 mm was clamped between the glass plates to fabricate a casting mold in which the spacer and glass plates are closely adhered without any gaps in between.

(3) After vacuum degassing a curable resin composition including a polymerizable unsaturated monomer and a polymerization curable unsaturated resin into which a curing accelerator and curing agent have been blended, said resin composition was poured into the opening of the casting mold and allowed to stand at normal temperature until generation of the heat of curing is completed.

(4) After after-curing said casting mold for 2 hours at 120° C., the casting mold was removed at normal temperature to obtain a casting plate.

Tensile Elongation Percentage

The technical term, tensile elongation percentage, refers to the tensile elongation percentage measured according to the following method in compliance with "Tensile Test Methods" in Japanese Industrial Standard JIS-K-7113.

(1) Production of Test Piece

A short piece measuring 175 mm×(20±0.5) mm×3 mm was cut out of the above casting plate to produce a dumbbell-shaped test piece provided with a parallel portion having a width of 10±0.5 mm in its central portion for 60±0.5 mm in the lengthwise direction. At this time, the width reduction from the 20 mm width of the original short piece to 10 mm has a curvature of a radius of 60 mm. After cutting a test piece to the above shape, the ends of said test piece were sanded with #400 to #800 sandpaper.

(2) Test Method

The thickness and width of the parallel portion of the above test piece were measured with a micrometer. An extensometer having a distance between reticules of 50 mm was placed on the parallel portion of the above test piece, locations 30 mm from both ends of the test piece were clamped with a test jig and stretched at the rate of 5 mm/min. The value obtained by dividing the maximum load at this time by the surface area of the parallel portion was taken to be the "tensile strength", and the degree of the elongation at the time of rupture was taken to be the "tensile elongation percentage".

Barcol Hardness

The technical term, Barcol hardness, refers to the Barcol hardness measured according to the following method in compliance with "JIS-K-7060 Barcol Hardness".

(1) The surface hardness of the above casting plate was measured using the Model GYZJ-934-1 hardness meter and Model GYZJ-935 hardness meter manufactured by the US's Barber-Colman Corp. At that time, the hardness obtained from the Model GYZH-934-1 hardness meter was taken to be the HBI-A value, or "Barcol hardness A value", while the hardness obtained from the Model GYZJ-935 hardness meter was taken to be the HBI-B value, or "Barcol hardness B value".

(2) Measurements were performed for at least 10 points for the above casting plate. The average values of each of the measurement results were designated as "Barcol hardness (A value)" and "Barcol hardness (B value)", respectively.

Heat Deflection Temperature

The technical term, Heat Deflection temperature, refers to the "Heat Deflection temperature" measured according to the following method in compliance with "JIS-K-7207 Heat Deflection temperature".

(1) Production of Test Piece

A short piece measuring 130 mm or more in length, 12.7 mm in width, and 3.0±0.2 mm thick was cut out of the above casting plate and used as the test piece followed by sanding the cut edges of the test piece with #400 to #800 sandpaper.

(2) Preparations for Measurement

The above test piece was placed upright in the direction of width to a height of 12.7 mm and immersed in an oil bath on a support stand having a span of 100 mm. When the load applied to the central portion of the above test piece was designated as P, P (kg)=2×18.5×[width(0.3±0.02 cm)]×[height (1.27 cm)]$^2$/[3×10 cm]–(loading jig kg). This load was applied to the central portion of the test piece, and a dial gauge that detects the deflection of the test piece through the loading jig was installed.

(3) A thermometer was placed in the oil bath in close proximity to the central portion of said test piece in order to measure oil temperature during the occurrence of deflection in the test piece.

(4) Measurement

The oil temperature when the oil temperature in the oil bath was raised at the rate of +2° C./min. and the dial gauge indicated a deflection value of 0.26 mm was taken to be the "Heat Deflection temperature".

The following provides an explanation of the surface layer (A), intermediate layer (B), and fiber-reinforced plastic layer (C) that compose the fiber-reinforced plastic molded article according to one embodiment of the present invention.

The surface layer (A) is preferably composed of a polymer material that demonstrates stable surface smoothness with respect to temperature changes, namely has superior smoothness that is unaffected by temperature changes. It is preferably formed with a coating, film, or cured gelcoat resin. The coating may be formed, for example, by coating a coating material such as acrylic resin, epoxy resin, urethane acrylic resin or polyester resin onto the intermediate layer (B) by a means such as spraying. In addition, the film may be a plastic film made of, for example, polyester, polyolefin, polyvinyl chloride, or polyacrylate, and is preferably colored. The cured gelcoat resin may be formed in the form of a cured product layer having a thickness of 0.1 to 1.0 mm, and preferably 0.3 to 0.5 mm, by spraying a gel coating material including a polymerization curable resin composition able to be cured at normal temperature to be described later onto a separation-treated mold surface with a sprayer. This cured gelcoat resin is preferably used from the viewpoints of high productivity and high performance of the fiber-reinforced plastic molded article of the present invention. Furthermore, in the case the surface layer (A) is the film, the surface layer (A) is preferably joined with the intermediate layer (B) by placing a primer layer or an adhesive layer in between the surface layer (A) and the intermediate layer (B).

The polymerization curable resin composition used for the above surface layer (A) is a curable unsaturated resin composition that is a liquid at normal temperature and which has for its main component a polymerization curable unsaturated resin, which is selected according to performance and the application, from a group including unsaturated polyester, epoxy(meth)acrylate, urethane(meth)acrylate, unsaturated polyesteracrylate, and mixtures thereof to be described later, and a polymerizable unsaturated monomer to be described later. Moreover, silicon oxide ($SiO_2$), having a silanol group and represented by filmed silica, an inorganic bentonite compound, or the like is mixed as a thixotropic agent into the curable unsaturated resin composition to give thixotropic properties to the resin composition, and the resin composition may be colored as necessary by adding pigment.

Examples of commercially available products of this curable resin composition include gel coated materials such as Polylite GC-130, GC-230, GC-251, GC-505 and GC-560 (all products are manufactured by DAINIPPON INK AND CHEMICALS, INC.).

The surface layer (A) may be of a single color, transparent, translucent, partially transparent, or partially translucent, and there are no particular restrictions on the presence or absence of coloring, design, pattern or other decorative means.

The intermediate layer (B) is composed of a cured product of an intermediate layer composition not including a fiber-reinforcing material but including a curable resin composition containing a polymerizable unsaturated monomer and a polymerization curable unsaturated resin, a filler, and a thixotropic agent. The intermediate layer composition preferably contains 30 to 150 parts by weight of filler and 1 to 4 parts by weight of thixotropic agent, relative to 100 parts by weight of the curable resin composition containing the polymerizable unsaturated monomer and the polymerization curable unsaturated resin. The above curable resin composition is capable of forming a casting plate having a tensile elongation percentage of 2 to 50% and a Barcol hardness (B value) of 50 or more due by its curing. The Barcol hardness (B value) is able to indicate hardness ranging from that which is comparatively soft to that which is comparatively hard. The Barcol hardness (B value) can also be indicated with Barcol hardness (A value). The above curable resin composition is preferably capable of forming a casting plate having a tensile elongation percentage of 2 to 50% and Barcol hardness (A value) of 30 or more by its curing. Moreover, a curable resin composition is even more preferable that is capable of forming a casting plate having a Heat Deflection temperature of 60° C. or more and a tensile strength of 10 MPa or more by its curing.

The polymerization curable unsaturated resin used in the intermediate layer (B) is preferably unsaturated polyester, epoxy(meth)acrylate, urethane(meth)acrylate or a mixture thereof. The curable resin composition is preferably a liquid at normal temperature that contains polymerization curable unsaturated resin at 45 to 75 wt % and polymerizable unsaturated monomer at 65 to 25 wt %. A casting plate obtained by adding curing accelerator and curing agent to the curable resin composition follwoed by curing has a tensile elongation percentage of 2 to 50%, preferably 3 to 20%, and more preferably 3 to 10%. In addition, the tensile strength of that casting plate is 10 MPa or more, and preferably 10 MPa to 100 MPa, and the Barcol hardness (A value) is 30 or more, and preferably 35 to 55, while the Barcol hardness (B value) is 50 or more, and preferably 50 to 95. If the tensile strength of the casting plate is less than 10 MPa, the plate has insufficient strength as a mold. If the tensile strength of the casting plate is greater than 100 MPa, the result may be an excessive design. If the Barcol hardness (A value) is less than 30, surface smoothness may be impaired due to susceptibility of the molded article surface to temperature changes. The Heat Deflection temperature of said casting plate is preferably 60° C. or more, and preferably 90° C. or more. Furthermore, either epoxy(meth) acrylate alone or its mixture with another polymerization curable unsaturated resin is preferably selected for the above polymerization curable unsaturated resin. By selecting in this manner, the molded article of the present invention is obtained that has ample elongation while maintaining comparatively high strength and Heat Deflection temperature (HDT), namely a molded article can be obtained that has high toughness, high heat resistance strength and satisfactory moisture resistance.

If the tensile elongation percentage of the casting plate obtained by curing the curable resin composition used for intermediate layer (B) of the present invention is less than 2%, cracks form more easily in the gel coating as comparison with the case of not providing an intermediate layer (B) if deflection or deformation occurs in the molded article. In addition, if the tensile elongation percentage of the above casting plate exceeds 50%, the previously mentioned prevention of cracking in the gel coating is better than in the case of not providing intermediate layer (B). However, there is increased susceptibility to print through by the fiber pattern during formation of the next fiber-reinforced plastic layer (C), and surface smoothness, which is the inherent object, tends to become poor over time.

The amount of filler used in intermediate layer (B) is 30 to 150 parts by weight, and preferably 60 to 100 parts by weight, relative to 100 parts by weight of the curable resin composition. If the amount of the filler exceeds 150 parts by weight, in addition to spraying becoming difficult to the increased viscosity, there are also disadvantages such as the allowable range of the amount of deflective deformation of the molded article with respect to the formation of cracks in the gel coating becoming smaller. In addition, even if the intermediate layer (B) contains the filler in an amount of less than 30 parts by weight, print through of the fiber pattern from the fiber-reinforced plastic layer can no longer be prevented.

The amount of thixotropic agent used in the intermediate layer (B) of the present invention is 1 to 4 parts by weight, and preferably 2 to 3 parts by weight, relative to 100 parts by weight of the curable resin composition. If the amount of thixotropic agent is outside the above range, namely less than 1 part by weight or greater than 4 parts by weight, spraying becomes difficult and problems such as the occurrence of running and defective leveling occur during spraying with a sprayer onto vertical surfaces. Since the intermediate layer of uniform thickness can therefore not be obtained, the gel coating surface has poor surface smoothness.

In addition, the gelation time and the viscosity of the curable resin composition used in the intermediate layer (B) of the present invention differ depending on the mixing method of the curing agent of the coating apparatus.

1) In the case of using a curable resin composition into which a curing agent has been blended in advance, the curable resin composition is supplied for each blended batch, and in the case of using a pneumatic spray gun that atomizes using compressed air, the gelation time of said curable resin composition is preferably 10 to 30 minutes, the viscosity is 20 to 40 poise, and the thixotropy is preferably 4 to 9. If the gelation time is within the above range, gelation inside the spray gun can be controlled during spraying, and if the viscosity is within the above range, spraying with a pneumatic spray gun becomes easier, thereby making this preferable.

2) In the case of using a plunger pump type of air spray gun in which the curing agent is mixed in the end of the spray nozzle (internal mixing) or the curing agent is simultaneously sprayed from a different nozzle in the form of spray mixing (external mixing), the gelation time of the curable resin composition blended with the curing agent is 3 to 8 minutes, the viscosity is greater than 40 poise but not more than 70 poise, and the thixotropy is preferably 4 to 9. Since gelation inside the spray gun does not present a problem in the case of using a plunger pump type of air spray gun using internal mixing or external mixing, it is not necessary to prolong the gelation time as in the manner of the case of the air gun previously mentioned, and when considering the molding cycle, a shorter gelation time is preferable. In addition, the viscosity of the intermediate layer composition is preferably greater than 40 but not more than 100 poise. This is preferable for high filling of filler from the perspective of preventing separation and settling during storage and inhibiting volatilization of styrene.

The above-mentioned unsaturated polyester is obtained in a reaction between dibasic acid containing an α,β-unsaturated dibasic acid and polyhydric alcohol, and if necessary, dicyclopentadiene compound. The unsaturated polyester preferably has a molecular weight within the range of 500 to 5000.

Examples of α,β-unsaturated dibasic acids used in the preparation of the unsaturated polyester include maleic acid, maleic anhydride, fumaric acid, itaconic acid, and itaconic anhydride. Examples of the saturated dibasic acids include phthalic acid, phthalic anhydride, halogenated phthalic anhydride, isophthalic acid, terephthalic acid, tetrahydrophthalic acid, tetrahydrophthalic anhydride, hexahydrophthalic acid, hexahydrophthalic anhydride, hexahydroterephthalic acid, hexahydroisophthalic acid, succinic acid, malonic acid, glutaric acid, adipic acid, sebacic acid, 1,12-didodecanoic acid, 2,6-naphthalenedicarboxylic acid, 2,7-naphthalenedicarboxylic acid, 2,3-naphthalenedicarboxylic acid, 2,3-naphthalenedicarboxylic anhydride, 4,4'-biphenyldicarboxylic acid, and their dialkyl esters.

Examples of polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butanediol, neopentyl glycol, bisphenol A hydride, 1,4-butanediol, addition products of bisphenol A and propylene oxide or ethylene oxide, 1,2,3,4-tetrahydroxybutane, glycerin, trimethylolpropane, 1,3-propanediol, 1,2-cyclohexane glycol, 1,3-cyclohexane glycol, 1,4-cyclohexane glycol, 1,4-cyclohexane dimethanol, paraxylene glycol, bicyclohexyl-4,4'-diol, 2,6-decalin glycol, and 2,7-decalin glycol. These may be used alone or by combining two or more types.

Examples of the above epoxy(meth)acrylate include di(meth)acrylates of bisphenol type epoxy resins, di(meth)

acrylates of novolak type epoxy resins, and di(meth) acrylates of 1,6-naphthalene type epoxy resins, which are obtained by reacting epoxy resin, preferably having an average epoxy equivalent within the range of 150 to 450, with unsaturated monobasic acid in the presence of esterification catalyst.

Examples of the above bisphenol type epoxy resins include bisphenol A epoxy resin, hydrogenated bisphenol A epoxy resin, bisphenol A ethylene oxide addition epoxy resin, bisphenol A propylene oxide addition epoxy resin, bisphenol F epoxy resin, 1,6-naphthalene epoxy resin, and the like.

In addition, examples of the above novolak type epoxy resins include epoxy resins obtained by reaction of phenol novolak or cresol novolak with epichlorhydrin or methylepichlorhydrin.

Moreover, examples of the above unsaturated monobasic acid include acrylic acid, methacrylic acid, cinnamic acid, crotonic acid, sorbic acid, monomethylmalate, monopropylmalate, monobutylmalate, mono(2-ethylhexyl) malate, and the like.

Furthermore, these unsaturated monobasic acids may be used alone or in a combination of two or more types. The above reaction between epoxy resin and unsaturated monobasic acid is carried out using an esterification catalyst at a temperature preferably within the range of 60 to 140° C., and particularly preferably 80 to 120° C.

Known, commonly used compounds can be used as is for the above esterification catalyst, examples including various types of tertiary amines, such as triethylamine, N,N-dimethylbenzylamine, N,N-dimethylaniline, or diazabicyclooctane, and diethylamine hydrochlorides.

The number average molecular weight of the epoxy(meth) acrylate is preferably within the range of 450 to 2,500, and particularly preferably within the range of 500 to 2,200. In the case the molecular weight is less than 450, the resulting cured product becomes sticky and strength properties decrease. On the other hand, if the molecular weight exceeds 2,500, curing time becomes longer and productivity becomes inferior.

The above urethane(meth)acrylate is obtained by reacting polyol, polyisocyanate and hydroxyl group-containing (meth)acrylic compound. Examples of polyols used include polypropylene oxide, polyethylene oxide, polytetramethylene glycol, bisphenol A ethylene oxide addition product and bisphenol A propylene oxide addition product and other polyether polyols, polybutadienediol, polyisoprenediol, polyester ether polyols, polyester polyols, and the like.

Examples of the above polyisocyanate include 2,4-tolylenediisocyanate and its isomers or isomer compounds (abbreviated as TDI), diphenylmethane diisocyanate, bexamethylene diisocyanate, isophorone diisocyanate, xylene diisocyanate, hydrogenated xylene diisocyanate, dicyclohexylmethane diisocyanate, tolidine diisocyanate, naphthaline diisocyanate, triphenylmethane triisocyanate, Burnock D-750, Crisbon NX (manufactured by DAINIPPON INK AND CHEMICALS, INC.), Desmodule L (manufactured by Sumitomo-Bayer Co., Ltd.), Coronate L (manufactured by Nippon Polyurethane Co., Ltd.), Takenate D102 (manufactured by Takeda Chemical Industries, Ltd.) and Isonate 143L (manufactured by Mitsubishi Chemical Corp.). These can be used alone or by combining two or more types. Among the above polyisocyanates, diisocyanates, and particularly TDI, is used preferably.

The hydroxyl group-containing (meth)acrylic compound is preferably a hydroxyl group-containing (meth)acrylic ester, examples of which include 2-hydroxyethyl(meth) acrylate, 2-hydroxypropyl(meth)acrylate and 3-hydroxybutyl(meth)acrylate; mono(meth)acrylates of alcohols having two hydroxyl groups such as polyethylene glycol mono(meth)acrylate and polypropylene glycol mono (meth)acrylate; addition products of α-olefin epoxides and (meth)acrylic acid and addition products of carboxylic glycidyl esters and (meth)acrylic acid; and, partial (meth) acrylates of alcohols having three or more hydroxyl groups such as di(meth)acrylates of tris(hydroxyethyl)isocyanuric acid and pentaerythritol tri(meth)acrylate.

In addition, in producing the urethane(meth)acrylate of the present invention, a portion of the hydroxyl group-containing (meth)acrylic compound may be substituted with a compound such as a hydroxyl group-containing aryl ether or higher alcohol to an extent that does not impair the effect of the present invention.

Examples of hydroxyl group-containing aryl ether compounds include ethylene glycol monoaryl ether, diethylene glycol monoaryl ether, triethylene glycol monoaryl ether, polyethylene glycol monoaryl ether, propylene glycol monoaryl ether, dipropylene glycol monoaryl ether, tripropylene glycol monoaryl ether, polypropylene glycol monoaryl ether, 1,2-butylene glycol monoaryl ether, 1,3-butylene glycol monoaryl ether, hexylene glycol monoaryl ether, octylene glycol monoaryl ether, trimethylolpropane diaryl ether, glycerin diaryl ether, pentaerythritol triaryl ether and other aryl ether compounds of polyhydric alcohols, while aryl ethers having one hydroxyl group are preferable.

Examples of higher alcohols include decyl alcohol, undecyl alcohol, lauryl alcohol, tridecyl alcohol and stearyl alcohol.

As one example of a production method of the urethane (meth)acrylate of the present invention, polyether polyol and polyisocyanate are first reacted at NCO/OH=2 to 1.5 so that the number average molecular weight is preferably 500 to 30000 and particularly preferably 700 to 5000 to form a terminal isocyanate group-containing urethane pre-polymer, followed by reacting a hydroxyl group-containing acrylic compound with this so that the hydroxyl groups are roughly equivalent to the isocyanate groups of said pre-polymer.

As an example of a different method, hydroxyl group-containing acrylic compound is first reacted with polyisocyanate followed by reacting the resulting isocyanate group-containing compound with polyether polyol to produce urethane(meth)acrylate preferably having a number average molecular weight of 500 to 30000, and more preferably 700 to 5000.

The polymerizable unsaturated monomer used in the curable resin composition of the present invention is that which is used in ordinary unsaturated polyester resin compositions, vinyl ester resins or vinyl urethane resin compositions within a range that does not impair the effect of the present invention, examples of which include styrene, α-methylstyrene, chlorostyrene, dichlorostyrene, divinylbenzene, t-butylstyrene, vinyltoluene, vinyl acetate, diarylbutarate, triarylcyanurate, acrylic ester and methacrylic ester; methyl(meth)acrylate, ethyl(meth)acrylate, n-butyl(meth)acrylate, i-butyl(meth)acrylate, t-butyl(meth) acrylate, 2-ethylhexyl(meth)acrylate, lauryl(meth)acrylate, cyclohexyl(meth)acrylate, benzyl(meth)acrylate, stearyl (meth)acrylate, tridecyl(meth)acrylate, dicylopentenyloxyethyl(meth)acrylate, ethylene glycol monomethylether(meth)acrylate, ethylene glycol monoethylether(meth)acrylate, ethylene glycol monobutylether(meth)acrylate, ethylene glycol monohexylether(meth)acrylate, ethylene glycol mono-2- ethylhexylether (meth)acrylate, diethylene glycol monomethylether(meth)acrylate, diethylene glycol monoethylether(meth)acrylate, diethylene glycol monobutylether(meth)acrylate, diethylene glycol monohexylether(meth)acrylate, diethylene glycol mono-2-ethylhexylether(meth)acrylate, dipropylene glycol monomethylether(meth)acrylate, dipropylene glycol monoethylether(meth)acrylate, dipropylene glycol monobutylether(meth)acrylate, dipropylene glycol monohexylether(meth)acrylate, dipropylene glycol mono-2-ethylhexylether(meth)acrylate, diethylene glycol di(meth)acrylate, dipropylene glycol di(meth)acrylate, neopentyl glycol di(meth)acrylate, 1,3-butylene glycol di(meth)acrylate, 1,6-hexanediol di(meth)acrylate, 2-hydroxy-1,3-dimethacryloxypropane, 2,2-bis[4-(methacryloxyethoxy)phenyl]propane, 2,2-bis[4-(methacryloxy-diethoxy)phenyl]propane, 2,2-bis[4-(methacryloxy-polyethoxy)phenyl]propane, tetraethylene glycol diacrylate, pentaerythritol diacrylate monostearate and other polymerization curable unsaturated resins and crosslinking polymerizable unsaturated monomers or unsaturated oligomers. These polymerizable unsaturated monomers may be used alone or in a combination of two or more types.

The filler used in the present invention is either a powdered or hollow filler preferably having a mean particle size of 0.5 to 200 $\mu$m. Examples of said powdered filler include calcium carbonate, silica, glass, alumina, clay, aluminum hydroxide, barium sulfate, calcium sulfate and quartzite, while examples of said hollow filler include organic hollow fillers (such as polyvinylidene chloride, polyvinyl chloride, polymethylmethacrylate, polymethylacrylate, polyacrylonitrile or copolymers of two or more of their types) and inorganic hollow fillers (such as glass, silica and ceramic). The particle size may be that which does not cause a problem in spraying with a sprayer during formation of the intermediate layer (B), lamination during formation of the fiber-reinforced plastic layer (C) or impregnation and degassing work. In addition, two or more types of these fillers may be used in combination. The filler is preferably a mixture of calcium carbonate powder and hollow filler. The mean particle size of the powdered filler is preferably 0.5 to 20 $\mu$m, and more preferably 2 to 8 $\mu$m. The mean particle size of the hollow filler is preferably 5 to 200 $\mu$m. In addition, the amount of hollow filler added is preferably 1 to 10 parts by weight, and more preferably 1 to 5 parts by weight, with respect to 100 parts by weight of the curable resin composition.

Examples of commercially available fillers used in the present invention include the calcium carbonate NS series (manufactured by Nitto Funka Co., Ltd.), aluminum hydroxide Higilite H series (manufactured by Showa Denko K.K.), alumina (manufactured by SUMITOMO CHEMICAL CO., LTD.) and calcium sulfate Franklin Fiber (manufactured by United States Gypsum Company). Examples of commercially available hollow fillers include Scotchlite Glass Bubble (manufactured by Sumitomo-3M Co., Ltd.), Dualite (manufactured by Pierce & Stevens Co.), Glass Microballoon (manufactured by Emerspon & Cuming Co.), Q-CEL Microcel (manufactured by Asahi Glass Co., Ltd.), Expancel Microcel (manufactured by Japan Phylite Co., Ltd.) and MFL series (manufactured by Matsumoto Oil Co., Ltd.). The use of the intermediate layer composition that contains the above hollow filler is particularly preferable because antifoaming properties are improved when spraying the intermediate layer (B) onto the back side of the surface layer (A) composed of a polymer material, and the specific gravity of said composition can be lowered.

The thixotropic agent used in the present invention may be of a form that imparts thixotropy to heat-curable resins. Specific examples include silica powders, asbestos, smectite, calcium sulfate whisker, and the like. Two or more types of the above agents may be used in combination as necessary.

Examples of commercially available thixotropic agents include REOLOSIL QS series (manufactured by Tokuyama Co., Ltd.), Aerosil series (manufactured by Nippon Aerosil Co., Ltd.), Benathix series (manufactured by Wilber-Ellis Co.), Cabosil series (manufactured by Cabot Co.), HDK series (manufactured by Wacker CO.) and Franklin Fiber (manufactured by USG Co.).

The fiber-reinforced plastic layer (C) of the present invention is provided on the previously cured intermediate layer (B) by either the hand lay up molding method, spray up molding method, or RTM (resin transfer molding) method in the same manner as fiber-reinforced plastic layers of the prior art so as to obtain the desired design strength and modulus of elasticity. Impregnation and degassing work are repeated for a polymerizable unsaturated resin composition blended with curing accelerator and curing agent into chopped strand mat and/or roving cloth having a fiber length of about 2 inches in the case of the hand lay up molding method, or into chopped strand having a fiber length of about 1 inch in the case of the spray up molding method, followed by curing at normal temperature or by heating. In addition, the RTM method involves first charging form glass mat or roving cloth and so forth into a mold followed by injection molding of a polymerizable unsaturated resin composition blended with curing accelerator and curing agent.

The polymerizable unsaturated resin composition used in the fiber-reinforced plastic layer (C) of the present invention is preferably unsaturated polyester, epoxy(meth)acrylate, urethane(meth)acrylate or a mixture thereof. Polymerizable unsaturated resins are dissolved in polymerizable unsaturated monomers, and are liquid resin compositions that can be cured at normal temperature by addition of curing accelerator and curing agent. In addition, the thixotropic agents described to follow may be added to prevent running and maintain workability, and the fillers described to follow may also be added within a range that does not impair workability and strength properties in consideration of cost, in the same manner as ordinary hand lay up molding and spray up molding methods. Moreover, pigment may also be added as necessary.

The polymerizable unsaturated resin used in said fiber-reinforced plastic layer (C) is obtained from the raw materials of the polymerization curable unsaturated resin used in the above intermediate layer (B).

The types and amounts added of curing agents, curing accelerators and retardants may be suitably selected and used in the resin compositions used for the surface layer (A), the intermediate layer (B), and the fiber-reinforced plastic layer (C) of the present invention to adjust their curing rate.

Examples of the above curing agents include azo compounds such as azoisobutyronitrile, and organic oxides such as known diacylperoxide, peroxyester, hydroperoxide, dialkylperoxide, ketone peroxide, peroxyketal, alkylperester and percarbonate compounds, specific examples of which include methylethyl ketone peroxide and benzoylperoxide. Two or more types of these may also be used in combination. The amount added is preferably 0.5 to 5 parts by weight with respect to 100 parts by weight of the curable resin composition.

Examples of curing accelerators include metallic soaps such as cobalt naphthenate, cobalt octenoate, vanadyl octenoate, copper naphthenate and barium naphthenate, and metallic chelating compounds such as vanadyl acetylacetate, cobalt acetylacetate, and iron acetylacetate. In addition, examples of amines include N,N-dimethylamino-p-benzaldehyde, N,N-dimethylaniline, N,N-diethylaniline, N,N-dimethyl-p-toluidine, N,N-bis(2-hydroxyethyl)-p-toluidine, 4-N,N-dimethylaminobenzaldehyde, 4-N,N-bis(2-hydroxyethyl)aminobenzaldehyde, 4-methylhydroxyethylaminobenzaldehyde, N,N-bis(2-hydroxypropyl)-p-toluidine, N-ethyl-m-toluidine, triethanolamine, m-toluidine, diethylenetriamine, pyridine, phenylmorpholine, piperidine and diethanolaniline.

The amount of curing accelerator added is preferably 0.001 to 5 parts by weight with respect to 100 parts by weight of the curable resin composition. Amine-based accelerators are preferable in the present invention. Furthermore, the curing accelerator may be added to the resin in advance, or may be added at the time of use.

Examples of curing retardants include trihydrobenzene, trihydroquinone, 1,4-naphthoquinone, parabenzoquinone, hydroquinone, benzoquinone, trimethylhydroquinone, hydroquinone monomethyl ether, p-tert-butylcatechol, 2,6-di-tert-butyl-4-methylphenol, 2,6-di-tert-butyl-4-dimethylamino-p-cresol and copper naphthenate.

The amount of curing retardant added is preferably 0.0001 to 0.1 parts by weight with respect to 100 parts by weight of the curable resin composition. Furthermore, the curing retardant may be added to the resin in advance or added at the time of use.

Moreover, various types of additives such as antifoaming agent, pigment, thinner or flame retardant may also be added as necessary.

Although any organic and inorganic dyes known in the prior art can be used as colorant, those having heat resistance and transparency are particularly superior, and those which do not remarkably obstruct curing of unsaturated resin are preferable.

Examples of the fiber reinforcing material used in fiber-reinforced plastic layer (C) of the present invention include glass fiber, aramid fiber, vinylon fiber, polyester fiber, Nylon fiber, carbon fiber, metal fiber and their combinations. Preferable examples are glass fiber and carbon fiber. In addition, there are no particular restrictions on the form of the fiber provided strengthening is obtained by the fiber during curing, examples of which include cloth, roving cloth, strands with roving cut out, chopped strand mat, and pair mat comprising stitching together roving cloth and chopped strand.

The usage ratio of the above fiber reinforcing material is 20 to 50 parts by weight, and preferably 30 to 40 parts by weight, with respect to 100 parts by weight of the polymerizable unsaturated resin composition composed of polymerizable unsaturated monomer and polymerizable unsaturated resin.

Production of the molded article of the present invention is carried out according to the following method. Curing accelerator and curing agent are blended into an intermediate layer composition comprising 30 to 150 parts by weight of filler and 1 to 4 parts by weight of thixotropic agent, with respect to 100 parts by weight of the above curable resin composition, the inside of the mold is coated with a mold releasing agent as necessary, and said intermediate layer composition is sprayed with a spraying apparatus and is cured to form the intermediate layer (B). Next, the fiber-reinforced plastic layer (C) is formed followed by removing the molded article from the mold and forming the surface layer (A) composed of a film or coating on the intermediate layer (B). Namely, a coating is applied, a coating film is formed, or a film is affixed to the intermediate layer (B), and that coating or film is used as the surface layer (A). Preferably, after coating and curing a gelcoat resin inside the mold to form a cured gelcoat resin layer, the above intermediate layer composition is sprayed onto said layer at a thickness of preferably 0.4 to 2.0 mm with a sprayer to form the intermediate layer (B), followed by forming the fiber-reinforced plastic layer (C) by spraying and so forth the above polymerizable unsaturated resin composition and then curing at normal temperature or by heating to obtain a molded article. At that time, a spraying apparatus in which the curing agent is mixed internally or that in which the curing agent is mixed externally can be used for spraying. Examples of internal mixing type spraying apparatuses that are used include that made by Venus Gasmar, while examples of spraying apparatuses of the external mixing type include those made by Binks CO. and Higashi-giken Co., Ltd. In addition, mixtures in which the curing agent is blended into said resin composition in advance may also be sprayed using a general-purpose paint sprayer. The spraying apparatus is normally composed of a pump, a pressure regulator, a spray gun, and a line heater.

Depending on the particular application, after producing a gel-coated FRP molded article, a colored acrylic urethane coating and so forth is applied to the surface of the cured gelcoat resin surface of the molded article of the present invention.

The following provides an explanation of the molding mold for fiber-reinforced plastic molding of the present invention.

The molding mold for fiber-reinforced plastic molding of the present invention preferably includes the surface layer (A), the fiber-reinforced plastic layer (C), and the intermediate layer (B) as an intermediate layer between the surface layer (A) and the fiber-reinforced plastic layer (C). Although typical molds for fiber-reinforced plastic molding are composed of a cured gelcoat resin layer and a fiber-reinforced plastic layer, in the present invention, the providing of intermediate layer (B) results in an FRP molding mold that has high surface smoothness and little dependency on molding temperature. Next, a specific example is described for obtaining a mold for fiber-reinforced plastic molding of the present invention.

A method in which the so-called matrix is obtained by existing methods can be used for the method for obtaining a mold for fiber-reinforced plastic molding of the present invention. For example, the mold material is preferably a material that has low levels of moisture and resin components and undergoes little dimensional changes, and examples of materials that can be used include homogeneous materials such as waterproof plywood, cedar, lauan, cypress and teak. Subsequently, routine putty filling and resin sealing are carried out, and for the resin for surface finishing coating, a resin composition containing styrene, acetone, curing agent and so forth in which a putty (skin putty) mixed with Aerosil, calcium carbonate, talc and so forth is added to a curing accelerator containing type of coating polyester resin, etc., is either spray coated or brush coated followed by curing. Continuing, the mold can then be sequentially wet polished using #200, #400 and #600 water proof sandpapers to smoothen the surface for use as a matrix. However, the matrix used in the present invention is not limited to that produced by the above method.

A mold releasing agent in the form of a wax-based or polyvinyl alcohol-based mold releasing agent is applied to the polished matrix followed by using the above gelcoat resin for the so-called mold gel coating, imparting the desired coloring and thixotropy, and either applying with a brush or spraying using a spray gun at a pressure of 3 to 6 kg/cm$^2$ to a thickness of about 0.5 to 0.8 mm to form the cured gelcoat resin layer. A gelcoat resin must be selected for the mold gel coating that has a durability that enables it to sufficiently withstand exposure to diluted monomers such as styrene during molding, namely has a superior solvent resistance, and has a superior cracking resistance that allows it to sufficiently withstand separation and impacts during product demolding.

Continuing, the intermediate layer (B) is molded by performing a procedure similar to that described above, followed by additionally laminating and molding the above fiber-reinforced plastic layer (C) as a backing to reinforce said molding mold. At this time, it is desirable to select and use the optimum resin composition and fiber reinforcing material according to the size, shape and so forth of the mold. Moreover, plywood, square bars, pipes and so forth can be used to further reinforce the mold as necessary.

The mold for fiber-reinforced plastic molding having a similar composition as the previously mentioned molded article obtained in this manner has a high surface smoothness and exhibits extremely little change in smoothness of the mold surface caused by differences in molding temperature, thereby making it extremely useful. Polishing can be performed sequentially using #400, #600, #800 and #1000 waterproof sandpapers as necessary, and the surface can be given a high finish by ultrafine buffing using a polishing compound. In addition, in the case of a molding mold having a complex shape or irregular surface, the mold can be used as a split mold. In addition, the mold can typically be used by providing with a draft.

The molding mold for fiber-reinforced plastic molding of the present invention can be used as a molding mold used in hand lay up molding, spray up molding, RIM (resin injection molding), VARI (vacuum assist resin injection) molding, vacuum bag molding and other general FRP molding, and there are no particular restrictions on the applications in which it is used.

Examples of the fiber-reinforced plastic molded article of the present invention include boat, jet sky and automobile parts, motorcycle parts, outdoor materials, bathtubs, waterproof pans and other molded articles requiring a smooth surface. These include FRP molded articles obtained by hand lay up molding, spray up molding and RTM molding, and there are no particular restrictions on their products or applications. In addition, the fiber-reinforced plastic molded article of the present invention can also be used in a wide range of applications of FRP molded articles requiring blister resistance and cracking resistance in addition to applications requiring a smooth exterior surface, a characteristic of the present invention.

EXAMPLES

Although the following provides a detailed explanation of the present invention by way of examples, the present invention is not limited to these Examples. In addition, the term "parts" in the explanation refers to parts by weight.

Synthesis Example 1
Synthesis of Epoxy Acrylate

After adding 458 parts of Epicron 850 (epoxy resin manufactured by DAINIPPON INK AND CHEMICALS, INC.), having an epoxy equivalent of 189 obtained by reacting bisphenol A and epichlorhydrin, 215 parts of methacrylic acid, 0.35 parts of hydroquinone and 2.1 parts of triethylamine followed by heating to 110° C. and reacting for 6 hours, 40.0 wt % of styrene monomer and 0.06 parts of trihydroquinone were added to obtain a resin composition containing 60.0 wt % epoxy acrylate and having a viscosity of 4.3 dPa·s. Moreover, 20 parts of styrene monomer were added to 100 parts of the resulting resin composition to obtain epoxy acrylate resin composition (1).

Synthesis Example 2
Synthesis of Unsaturated Polyester 1509 parts of triethylene glycol, 664 parts of dipropylene glycol, 1887 parts of phthalic anhydride, and 221 parts of maleic anhydride were charged into a 5 liter four-mouth flask equipped with a thermometer, stirrer, inert gas feed port and reflux condenser followed by heating to 205° C. in a nitrogen atmosphere. When the solid acid value reached 18.6, 0.10 parts of trihydroquinone and 27 wt % of styrene monomer were added to obtain a resin composition containing 73.0 wt % unsaturated polyester and having an acid value of 13.5 and a viscosity of 12.0 dPa·s. Moreover, 30 parts of styrene monomer were added to 100 parts of the resulting resin composition to obtain unsaturated polyester resin composition (2).

Synthesis Example 3
Synthesis of Unsaturated Polyester 760.8 parts of propylene glycol, 620.7 parts of ethylene glycol, 1480 parts of phthalic anhydride, and 981 parts of maleic anhydride were charged into a 5 liter four-mouth flask equipped with a thermometer, stirrer, inert gas feed port and reflux condenser followed by heating to 205° C. in anitrogen atmosphere. When the solid acid value reached 40.5, 0.10 parts of trihydroquinone and 34 wt % of styrene monomer were added to obtain a resin composition containing 66.0 wt % unsaturated polyester and having an acid value of 26.7 and a viscosity of 10.2 dPa·s. Moreover, 25 parts of styrene monomer were added to 100 parts of the resulting resin composition to obtain unsaturated polyester resin composition (3)

Synthesis Example 4
Synthesis of Unsaturated Polyester 837 parts of propylene glycol, 523 parts of ethylene glycol, 814 parts of phthalic anhydride, and 1618 parts of maleic anhydride were charged into a 5 liter four-mouth flask equipped with a thermometer, stirrer, inert gas feed port and reflux condenser followed by heating to 205° C. in a nitrogen atmosphere. When the solid acid value reached 36.9, 0.10 parts of trihydroquinone and 34 wt % of styrene monomer were added to obtain a resin composition containing 66.0 wt % unsaturated polyester and having an acid value of 24.1 and a viscosity of 9.7 dPa·s. Moreover, 22 parts of styrene monomer were added to 100 parts of the resulting resin composition to obtain unsaturated polyester resin composition (4).

Synthesis Example 5
Synthesis of Urethane Acrylate 174 parts of toluidine isocyanate (TDI) and 350 parts of PPG having a number average molecular weight of 700 were charged into a 1 liter four-mouth flask equipped with a thermometer, stirrer, inert gas feed port and reflux condenser and were allowed to react for 5 hours at 80° C. in a nitrogen atmosphere. Since the NCO equivalents reached 530, which is nearly the same value as the theoretical value, and stabilized, the mixture was cooled to 40° C. followed by the addition of 130 parts of 2-hydroxyethylmethacrylate and reacting for 4 hours at 80° C. in a nitrogen atmosphere. After confirming the isocyanate group content (%) to be 0.1% or less, 0.05 parts of trihydroquinone and 0.025 parts of tertiary butylcatechol were added, and after lowering the temperature to 50° C., 440 parts of styrene were added to obtain polyurethane acrylate resin composition (5) containing 60% non-volatile resin and having a Gardner viscosity of I–J.

Synthesis Example 6
Synthesis of Unsaturated Polyester 312 parts of neopentyl glycol, 159 parts of diethylene glycol, 50 parts of propylene glycol and 382 parts of isophthalic acid were charged into a 5 liter four-mouth flask equipped with a thermometer, stirrer, inert gas feed port and reflux condenser followed by heating to 210° C. After allowing to react until the acid value reached 2,255 parts of maleic anhydride were charged into the flask followed by heating to 205° C. in a nitrogen atmosphere. When the solid acid value reached 4.0, 0.10 parts of trihydroquinone and 585 parts of styrene monomer were added to obtain an unsaturated polyester resin composition (6) containing 61.5 wt % unsaturated polyester and having an acid value of 4.0 and a viscosity of 14.0 dPa·s.

Example 1
(Production of Casting Plate)

0.5 parts of 6% cobalt naphthenate as curing accelerator and 1.0 parts of 55% methylethyl ketone peroxide (MEKPO) as curing agent were added to 100 parts of a curable resin composition including a blend of 40 wt % of the epoxy acrylate resin composition (1) and 60 wt % of the unsaturated polyester resin composition (2) followed by the production of a casting plate in accordance with Section 5.2.3 of JIS-K-6919.

<Measurement of Casting Plate Tensile Elongation Percentage, Tensile Strength and Heat Deflection temperature (HDT)>

No. 1 test pieces according to JIS-K-7113 were cut out from the casting plate followed by measurement of tensile elongation percentage and tensile strength for n=5 based on the previously mentioned definitions of technical terms. In addition, load deflection load (Heat Deflection temperature) was measured in compliance with JIS-K-7207 using said casting plate. Measurements performed at room temperature were designated as "RT".

<Measurement of Barcol Hardness>

Values measured using the Model GYZ-J-935 soft material hardness meter based on the previously mentioned definitions of technical terms were expressed as HBI-B valves. In addition, values measured using the GYZ-J-934-1 hard material hardness meter were expressed as HBI-A values.

<Production of Intermediate Layer Resin Composition>

0.5 parts of curing accelerator (6% cobalt naphthenate), 0.1 part of curing agent (dimethylaniline), 2.3 parts of thixotropic agent (Aerosil #200 manufactured by Nippon Aerosil Co. Ltd.,), 77 parts of calcium carbonate (SS-80 having a mean particle size of 2.61 microns as calculated from specific surface area) as filler, and 3 parts of hollow filler (Dualite-M6017AE manufactured by Pierce & Stevens Co., which has a volume of 50%, and a diameter of 90 microns) were blended with respect to 100 parts of curable resin composition including a blend of 45 wt % of the epoxy acrylate resin composition of Synthesis Example (1) and 55 wt % of the unsaturated polyester resin composition of Synthesis Example (2) in the same manner as the resin composition for casting plate production to obtain an intermediate layer composition (1) by adjusting to the viscosity of 45.0 dPa·s and the thixotropy of 6.7.

1.0 part of 55% MEKPO were added to 100 parts of the resulting intermediate layer composition (1) and normal temperature gelation time was measured in compliance with section 4.8 of JIS-K-6901. The normal temperature gelation time of the intermediate layer composition (1) was 7.5 minutes.

(Production of Cured Gelcoat Resin Layer)

A gelcoat resin composition in which 10 parts of pigment (Polyton White 107J manufactured by DAINIPPON INK AND CHEMICALS, INC.), 0.5 parts of 6% cobalt naphthenate and 1.0 part of curing agent (Parmec N manufactured by Nippon Oil Co., Ltd.) were blended with 100 parts of a clear gelcoat resin composition (POLYLITE GC-560 manufactured by DAINIPPON INK AND CHEMICALS, INC.) was sprayed onto a mold release treated glass plate (350× 350 mm) to a thickness of 0.4 mm by means of the Model W-77 spray gun (manufactured by Iwata Tosoki Co., Ltd. and having a diameter of 2.5 mm), and then was cured until tack-free at normal temperature.

(Production of Cured Gelcoat resin Layer-Intermediate Layer)

Next, using the Model HLL-9000 spray gun (manufactured by Higashi-giken Co., Ltd.), an intermediate layer was sprayed onto the above gel coat to a thickness of 1.5 mm at a blend of 1.0 parts of curing agent (Parmec N manufactured by Nippon Oil Co., Ltd.), to 100 parts of the intermediate layer resin composition (1), and then was cured until tack-free at normal temperature.

(Formation of Fiber-Reinforced Plastic Layer/Production of Fiber-Reinforced Plastic Sheet)

1.0 part of curing agent (Parmec N manufactured by Nippon Oil Co., Ltd.) was blended with 100 parts of FRP lamination resin for hand lay up molding (POLYLITE FH-123-NM manufactured by DAINIPPON INK AND CHEMICALS, INC.) and FRP laminated formation was performed on the above intermediate layer with a glass fiber composition of MM' RMR.

M: 450 g/m² chopped strand mat (manufactured by NITTOBO CO., LTD.), glass content: 33 wt %

M': 600 g/m² chopped strand mat (manufactured by NITTOBO CO., LTD.), glass content: 33 wt %

R: 600 g/m² roving cloth (manufactured by NITTOBO CO., LTD.), glass content: 50 wt %

After curing for 72 hours at normal temperature, demolding was performed to obtain fiber-reinforced plastic molded article A comprised of the cured gelcoat resin layer (A), the intermediate layer (B), and the fiber-reinforced plastic layer (C).

(Evaluation of Fiber-Reinforced Plastic Molded Article A)
<Evaluation of Surface Smoothness>

Surface smoothness immediately after demolding and one week later were measured for the resulting fiber-reinforced plastic molded article A using WaveScan Plus (manufactured by BYK-Gardner Co.). The GM-Tension value* calculated using WaveScan Plus (manufactured by BYK-Gardner Co.) was used as the indicator of surface smoothness.

*: The greater the GM-Tension value (max. 21), the better the surface smoothness. Evaluation results are shown in Table 1.

<Evaluation of Cracking Resistance of Cured Gelcoat resin Layer>

Fiber-reinforced plastic molded article A was cut into widths of 25 mm and a bending test was performed using for the span a distance of 1.6 time (mm) the thickness. A load was applied from the laminated surface and evaluation was made based on the greater the amount of deflection when cracks occurred in the gelcoat resin layer, the better the resistance to cracking. Evaluation results are shown in Table 1 in the same manner as surface smoothness.

<Evaluation of Blistering Resistance>

Fiber-reinforced plastic molded article A was cut into squares measuring 10 cm on a side and a one-side boiling test was performed with hot water at 92° C. The gel coated surface was visually examined for the presence of blistering. According to the results, fiber-reinforced plastic molded article A provided with an intermediate layer according to the present invention was observed to demonstrate high blistering resistance in comparison with a molded article of a reference example. Although blisters formed after 50 hours of one-side boiling testing for the molded article obtained in a reference example, fiber-reinforced plastic molded article A obtained in Example 1 was not observed to form blisters even after 200 hours of one-side boiling testing.

Furthermore, although the measurement results of Example 1 are shown in Table 1, since the HDT (Heat Deflection temperature) value was about room temperature, it is indicated as RT.

Example 2

With the exception of using 80 wt % of the epoxy acrylate resin composition used in Example 1 and 20 wt % of the unsaturated polyester resin composition (3) for the curable resin composition, using 51 parts of calcium carbonate (NS-100 having a mean particle size of 2.12 microns as calculated from specific surface area), 4 parts of hollow filler (Dualite-M6017AE manufactured by Pierce & Stevens Co., which has a volume of 50%, and a diameter of 90 microns) and 30 parts of calcium carbonate (R manufactured by Maruo Calcium Co., Ltd., which has a mean particle size of 7.4 microns as calculated from specific surface area) as fillers, using 2.3 parts of REOLOSIL QS-20L (manufactured by Tokuyama Co., Ltd.) as thixotropic agent, and adjusting the viscosity of the intermediate layer resin composition to 47.0 and the thixotropy to 6.5, evaluation was performed in the same manner as Example 1. Those results are shown in Table 1.

Example 3

With the exception of using 100 parts of the epoxy acrylate resin composition (1) for the curable resin composition and adjusting the viscosity of the intermediate layer resin composition to 47.0 and the thixotropy to 6.9, evaluation was performed in the same manner as Example 1. Those results are shown in Table 1.

Example 4

With the exception of using 57 parts of calcium carbonate (SS-80 manufactured by Nitto Funka Co., Ltd., which has a mean particle size of 2.6 microns as calculated from specific surface area) and 3 parts of hollow filler (Dualite-M6017AE manufactured by Pierce & Stevens Co., which has a volume of 50% and a diameter of 90 microns) as filler, and adjusting the viscosity of the intermediate layer composition to 30.0, the thixotropy to 6.5 and the gelation time to 25.5 minutes, evaluation was performed in the same manner as Example 3. Those results are shown in Table 1.

TABLE 1

|  | Example 1 | Example 2 | Example 3 | Example 4 |
| --- | --- | --- | --- | --- |
| Curable resin composition | (1)/(2) = 45/55(%) | (1)/(3) = 80/20(%) | (1) 100(%) | (1) 100(%) |
| Elongation percent. (%) | 28 | 5.0 | 7.0 | 7.0 |
| Barcol hardness | 60(HBI-B) | 40(HBI-A) 76(HBI-B) | 36(HBI-A) 75(HBI-B) | 36(HBI-A) 75(HBI-B) |
| Tensile strength (MPa) | 15 | 64 | 75 | 75 |
| HDT(° C.) | RT | 92 | 102 | 102 |
| Amt. of filler (parts) |  |  |  |  |
| Cal. Carb. SS-80 | 77 |  | 77 | 57 |
| Cal. Carb. NS-100 |  | 51 |  |  |
| Cal. Carb. R |  | 30 |  |  |
| Hollow filler* | 3 | 4 | 3 | 3 |
| Amt. of thixotropic agent (parts) | 2.3 Aerosil #200 | 2.3 REOLOSIL QS20L | 2.3 Aerosil #200 | 2.3 Aerosil #200 |
| Intermediate layer composition: |  |  |  |  |
| Viscosity | 45.0 | 47.0 | 47.0 | 30 |
| Thixotropy | 6.7 | 6.5 | 6.9 | 6.5 |
| Gelation time | 7.5 | 7.0 | 6.5 | 25.5 |
| Surface smoothness |  |  |  |  |
| After demolding | 20.5 | 20.6 | 20.5 | 20.2 |
| After 72 hours | 19.4 | 20.2 | 20.3 | 20.0 |
| Cracking deflection (mm) | 4.4 | 3.0 | 3.0 | 4.5 |
| Remarks | Excellent surface smoothness no change over time. Larger deflection than past, excellent cracking resistance | Same as left | Same as left | Same as left |

Example 5

With the exception of using 80 parts of the epoxy acrylate resin composition (1) and 20 parts of the urethane acrylate resin composition (5) for the curable resin composition and adjusting the viscosity of the intermediate layer resin composition to 45.0 and the thixotropy to 6.8, evaluation was performed in the same manner as Example 1. Those results are shown in Table 2.

Example 6

With the exception of using 80 parts of epoxy acrylate resin composition (1) and 20 parts of unsaturated polyester resin composition (6) for the curable resin composition, and adjusting the viscosity of the intermediate layer composition to 50.0 and the thixotropy to 6.9, evaluation was performed in the same manner as Example 1. Those results are shown in Table 2.

Example 7

With the exception of using 100 parts of unsaturated polyester resin composition (6) for the curable resin composition and adjusting the viscosity of the intermediate layer resin composition to 49.0 and the thixotropy to 7.1, evaluation was performed in the same manner as Example 1. Those results are shown in Table 2.

Example 8

With the exception of using 100 parts of epoxy acrylate resin composition (1) for the curable resin composition and adjusting the viscosity of the intermediate layer resin composition to 70.2 and the thixotropy to 6.5, evaluation was performed in the same manner as Example 1. Those results are shown in Table 2.

TABLE 2

|  | Example 5 | Example 6 | Example 7 | Example 8 |
| --- | --- | --- | --- | --- |
| Curable resin composition | (1)/(5) = 80/20(%) | (1)/(6) = 80/20(%) | (6) 100(%) | (1) 100(%) |
| Elongation percent. (%) | 21 | 5.8 | 5.0 | 7.0 |
| Barcol hardness | 18(HBI-A) 60(HBI-B) | 40(HBI-A) 74(HBI-B) | 42(HBI-A) 75(HBI-B) | 36(HBI-A) 75(HBI-B) |
| Tensile strength (MPa) | 31 | 62 | 83 | 75 |
| HDT(° C.) | RT | 90 | 82 | 102 |
| Amt. of filler (parts) |  |  |  |  |
| Cal. Carb. SS-80 | 77 | 77 | 77 | 77 |
| Hollow filler* | 3 | 3 | 3 | 3 |
| Amt. of thixotropic agent (parts) | 2.3 REOLOSIL QS20L | 2.3 REOLOSIL QS20L | 2.3 REOLOSIL QS20L | 2.3 REOLOSIL QS20L |
| Intermediate layer composition: |  |  |  |  |
| Viscosity | 45.0 | 42.0 | 49.0 | 70.2 |
| Thixotropy | 6.8 | 6.9 | 7.1 | 6.5 |
| Gelation time | 7.0 | 6.5 | 7.0 | 7.5 |
| Surface smoothness |  |  |  |  |
| After demolding | 20.4 | 20.5 | 20.6 | 20.5 |
| After 72 hours | 19.5 | 20.2 | 20.2 | 20.4 |
| Cracking deflection (mm) | 4.0 | 3.0 | 2.9 | 2.9 |
| Remarks | Excellent surface smoothness no change over time. Larger deflection than past, excellent cracking resistance | Same as left | Same as left | Same as left |

Example 9

With the exception of not providing a gelcoat resin layer (gel coat-less) and using the resin composition used as the intermediate layer resin composition in Example 1 for the surface layer, a fiber-reinforced plastic molded article was obtained in the same manner as Example 1.

Moreover, 23 parts of curing agent (Burnock DN-980) were blended with 100 parts of acrylic resin (Acryldic A-801-P) as coating material followed by spray coating, curing for 30 minutes at 60° C. and then for 24 hours at normal temperature, and measuring the surface smoothness of the molded article 1 week later in the same manner as previously described.

The results for surface smoothness were such that the GM-Tension value was 20.2, and the GM-Tension value 72 hours after demolding was 19.8, thereby confirming that high surface smoothness is maintained in the same manner as the results for Example 1.

Example 10

With the exception of using mold gel coating resin (NC-72370 manufactured by Nippon Fellow Co., Ltd.) as gel coating resin, a fiber-reinforced plastic molded article obtained in the same manner as Example 3 was evaluated as a molding mold for fiber-reinforce plastic molding. The resulting molding mold was subjected to temperature changes of 20° C., 60° C. and 80° C., and the mold surface smoothness at each temperature was measured using the surface smoothness evaluation method previously described. Those results are shown in Table 3. The molding mold produced according to the present invention was confirmed to exhibit hardly any change in surface smoothness caused by changes in temperature.

Comparative Example 1

With the exception of using 80 wt % of the unsaturated polyester resin composition (2) and 20 wt % of the unsaturated polyester resin composition (3) as polymerization curable unsaturated resin, and adjusting the viscosity of the intermediate layer resin composition to 38.7 and the thixotropy to 6.8, evaluation was performed in the same manner as Example 1. Those results are shown in Table 3.

Comparative Example 2

With the exception of using 100 parts of the unsaturated polyester resin composition (4) as polymerization curable unsaturated resin, and adjusting the viscosity of the intermediate layer resin composition to 41.2 and the thixotropy to 7.1, evaluation was performed in the same manner as Example 1. Those results are shown in Table 3.

Comparative Example 3

With the exception of using 25 parts of calcium carbonate (SS-30 manufactured by Nitto Funka Co., Ltd., which has a mean particle size of 7.41 microns as calculated from specific surface area) as filler, using 1.3 parts of thixotropic agent (Aerosil #200), and adjusting the viscosity of the intermediate layer resin composition to 19.3 and the thixotropy to 5.6, evaluation was performed in the same manner as Example 1. Those results are shown in Table 3.

Comparative Example 4

With the exception of using 170 parts of calcium carbonate (R manufactured by Maruo Calcium Co., Ltd., which has a mean particle size of 7.4 microns as calculated from specific surface area) as filler and adjusting the viscosity of the intermediate layer resin composition to 140.0 and the thixotropy to 6.1, evaluation was performed in the same manner as Example 1. Those results are shown in Table 3.

Comparative Example 5

With the exception of not using an intermediate layer, which is a characteristic of the present invention, a fiber-reinforced plastic molded article obtained in the same manner as Example 10 was used for evaluation as, a fiber-reinforced plastic molding mold of the prior art. The surface smoothness of this molding mold was such that print through of the fiber pattern was observed from the fiber-reinforced plastic layer, and surface smoothness was poor. Those results are shown in Table 3.

In addition, the surface was sequentially polished with #400, #600, #800 and #1000 waterproof sandpapers followed by surface buffing using a polishing compound to produce a molding mold with a mold surface having a GM-Tension value of 19.0 as determined by the previously mentioned surface smoothness evaluation. Continuing, in order to observe the effects of temperature change on the mold surface, the molding mold was subjected to temperatures of 20° C., 40° C., 60° C. and 80° C. in the same manner as Example 10 and surface smoothness at each temperature was measured using the previously mentioned surface smoothness evaluation method. Those results are shown in Table 4. The smoothness of the molding mold surface was observed to change and become impaired accompanying changes in temperature.

TABLE 3

|  | Comp. Ex. 1 | Comp. Ex. 2 | Comp. Ex. 3 | Comp. Ex. 4 | Comp. Ex. 5 |
| --- | --- | --- | --- | --- | --- |
| Curable resin composition | (2)/(3) = 80/20(%) | (4) 100(%) | (1)/(2) = 45/55(%) | (1)/(2) = 45/55(%) | None |
| Elongation percentage (%) | 64 | 1.7 | 28 | 28 | None |
| Barcol hardness | 40(HBI-B) | 44(HBI-A) 76 (HBI-B) | 60(HBI-B) | 60(HBI-B) | — |
| Tensile strength (MPa) | 7 | 60 | 15 | 15 | — |
| HDT(° C.) | RT | 112 | RT | RT | — |
| Amt. of filler (parts) |  |  |  |  |  |
| Calc. Carb. SS-80 | 77 | 77 |  |  | None |
| Calc. Carb. SS-30 |  |  | 25 |  |  |
| Calc. Carb. R |  |  |  | 170 |  |
| Hollow filler* | 3 | 3 | — | — |  |
| Amt. of thixotropic agent | 2.3 Aerosil #200 | 2.3 Aerosil #200 | 1.3 Aerosil #200 | 2.3 Aerosil #200 | None |
| Intermediate layer comp. |  |  |  |  |  |
| Viscosity | 38.7 | 41.2 | 19.3 | 140 | None |
| Thixotropy | 6.8 | 7.1 | 5.6 | 6.1 |  |
| Surface smoothness |  |  |  |  |  |
| After demolding | 19.0 | 19.8 | 18.2 | Not sprayable | 17.0 |
| After 72 hours | 14.6 | 18.7 | 14.1 |  | 15.2 |
| Cracking | 5.0 | 1.8 | 3.0 | Not | 2.1 |

TABLE 3-continued

|  | Comp. Ex. 1 | Comp. Ex. 2 | Comp. Ex. 3 | Comp. Ex. 4 | Comp. Ex. 5 |
|---|---|---|---|---|---|
| deflection (mm) |  |  |  | sprayable |  |
| Remarks | Superior surface smoothness after demolding, but changes overtime, surface smoothness inferior to prior art | Superior surface smoothness but low deflection and inferior cracking resistance | Superior surface smoothness after demolding, but changes over time, surface smoothness inferior to prior art | Difficulty in spraying with sprayer, unable to form intermediate layer | No intermediate layer (B), in accordance with prior art |

TABLE 4

|  | Mold temperature | Example 10 | Comp. Ex. 5 |
|---|---|---|---|
| Evaluation of surface smoothness of molding mold according to temp. changes | 20° C. | 20.5 | 19.0 |
|  | 40° C. | 20.4 | 18.5 |
|  | 60° C. | 20.4 | 17.5 |
|  | 80° C. | 20.2 | 15.5 |
| Remarks |  | High surface smoothness maintained regardless of changes in mold temperature | Surface smoothness impaired by changes in mold temperature |

The present invention provides a fiber-reinforced plastic molded article that has superior surface smoothness that is stable with respect to temperature changes, namely the surface of which is not affected by temperature changes, inhibits the occurrence of surface blisters with respect to hot water resistance, and has a large allowable range of the amount of deflection and deformation enabling it to prevent cracking of the surface layer, and provides its production method and its molding mold.

What is claimed is:

1. A fiber-reinforced plastic molded article including a surface layer (A) containing a polymer material, an intermediate layer (B), and a fiber-reinforced plastic layer (C), wherein
   (1) said intermediate layer (B) is composed of a cured product of an intermediate layer composition comprising a curable resin composition including a polymerizable unsaturated monomer and a polymerization curable unsaturated resin, a filler, and a thixotropic agent,
   (2) said curable resin composition is able to form a casting plate having a tensile elongation percentage of 3 to 50% and a Barcol hardness (B value) of 50 or more by its curing,
   (3) the content of said filler is 30 to 150 parts by weight relative to 100 parts by weight of the curable resin composition, and said filler contains a hollow filler having a mean particle size of 5 to 200 μm, and
   (4) the content of said thixotropic agent is 1 to 4 parts by weight relative to 100 parts by weight of the curable resin composition.

2. A fiber-reinforced plastic molded article according to claim 1, wherein said curable resin composition has a gelation time of 10 to 30 minutes and a viscosity of 20 to 40 poise.

3. A fiber-reinforced plastic molded article according to claim 1, wherein said curable resin composition has a gelation time of 3 to 8 minutes and a viscosity of more than 40 but no more than 100 poise.

4. A fiber-reinforced plastic molded article according to claim 1, wherein said polymerization curable unsaturated resin is at least one type selected from a group including epoxy(meth)acrylate resin, urethane(meth)acrylate resin, and unsaturated polyester.

5. A fiber-reinforced plastic molded article according to claim 1, wherein said curable resin composition is able to form a casting plate having a tensile elongation percentage of 3 to 10% and a Barcol hardness (B value) of 50 to 95 by its curing.

6. A fiber-reinforced plastic molded article according to claim 1, wherein said curable resin composition is able to form a casting plate having a Heat Deflection temperature of 60° C. or more, a tensile strength of 10 MPa or more, and a Barcol hardness (A value) of 30 or more.

7. A fiber-reinforced plastic molded article according to claim 1, wherein said filler is calcium carbonate powder.

8. A fiber-reinforced plastic molded article according to claim 1, wherein said surface layer (A) is composed of a cured product of a gelcoat resin.

9. A molding mold equipped with the fiber-reinforced plastic molded article according to claim 1.

* * * * *